June 20, 1950 D. L. ARENBERG 2,512,130
DELAY MEANS
Filed April 2, 1946
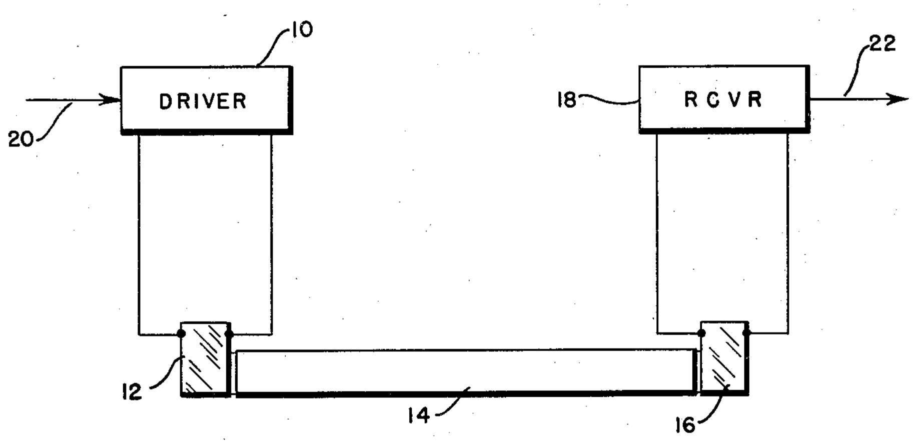
INVENTOR
DAVID L. ARENBERG
BY
William D. Hall
ATTORNEY Patented June 20, 1950

2,512,130

UNITED STATES PATENT OFFICE 2,512,130

DELAY MEANS

David L. Arenberg, Rochester, Mass., assignor, by mesne assignments, to the United States of America as represented by the Secretary of War Application April 2, 1946, Serial No. 659,112

11 Claims. (Cl. 178—44)

This invention relates to delay means and more particularly to supersonic delay lines employing an improved transmission medium.

In many electronic applications it is desirable to delay a signal for a short period of time, for example, a few microseconds or a few milliseconds. This may be done by the use of so-called electronic delay lines made up of inductors and capacitors. In some instances a supersonic delay line is more applicable. These supersonic delay lines comprise a transmission medium usually in the form of a bar or rod of suitable material with a piezoelectric crystal mounted at either end thereof. The mounting of the crystals may be accomplished by cementing them to the ends of the rod of the transmission material or they may be held against the rod by means of a spring and an oil film may be introduced between the crystals and the rod to assure good mechanical contact therebetween.

In the use of this type of delay line a signal is applied to one of the piezoelectric crystals causing this crystal to mechanically vibrate. These mechanical vibrations travel axially along the rod of transmission material and upon reaching the other end thereof cause mechanical stresses in the second piezoelectric crystal. These mechanical stresses cause an electrical signal to appear between the two faces of the crystal in accordance with the well known piezoelectric phenomena. This electrical signal appearing across the crystal is substantially identical to the signal applied to the first crystal but occurs later in time by an amount equal to the time required for the signal to travel the length of the rod of transmission material. In previous applications of supersonic transmission lines it has been found that, for optimum operation of the lines, the signal applied to the transmitting crystal should be of an oscillatory nature and have a frequency in the region of 10 to 30 megacycles per second and the transmitting and receiving crystals should be designed to mechanically oscillate freely at the carrier frequency. The mechanical oscillation of the transmitting crystal will cause compressional or transverse waves of a frequency of 10 to 30 megacycles to travel down the rod of transmission material, hence, the name, supersonic delay line.

One disadvantage of this type of delay line is that in previously employed transmission material the attenuation of the signal in delay lines having a time delay of more than a few microseconds may be high enough so that the signal at the receiving crystal is at too low an energy level.

It is an object of the present invention therefore to provide a transmission material having a lower attenuation than transmission materials previously employed.

It is a further object of this invention to provide a supersonic delay line in which the attenuation of a signal passing therethrough is relatively low.

For a better understanding of the invention together with other and further objects thereof, reference is had to the following description taken in connection with the accompanying drawing in which the sole figure is a schematic diagram in block form of the present invention.

In the drawing, the driver circuit 10 is connected to two faces of a piezoelectric crystal 12. Piezoelectric crystal 12 is mounted at one end of a rod or bar of transmission material 14, and a second piezoelectric crystal 16 is located at the other end of bar 14. The two faces of crystal 16 are connected to a receiver circuit 18. An input connection 20 to driver circuit 10 provides means for applying a signal to be delayed to circuit 10 and an output connection 22 from receiver 18 provides the delayed signal. Connections 20 and 22 may be connected in any circuit where a signal is to be delayed.

In the operation of the delay line the signal to be delayed is applied to driver 10 by the way of connection 20 and driver circuit 10 causes the applied signal to amplitude modulate a signal of frequency from 10 to 30 megacycles. This modulated signal is applied to crystal 12 causing this crystal to mechanically oscillate at a frequency determined by the frequency of the signal from driver circuit 10 with an amplitude determined by the amplitude of the signal from driver circuit 10. The compressional waves set up by crystal 12 travel along rod 14 and strike crystal 16 causing mechanical stresses in this crystal. The electrical signal appearing across crystal 16 is supplied to receiver circuit 18 which demodulates the signal and provides at connection 22 a signal that is substantially the same as the signal applied to connection 20. The time delay between the time of occurrence of a signal applied at connection 20 and the time of occurrence of a signal appearing at connection 22 depends upon and may be calculated from the physical length of rod 14 and the speed of transmission of supersonic energy in this rod. The speed of transmission of supersonic energy in rod 14 will, of course, depend primarily upon the type of material of which rod 14 is made. Previous delay lines have employed fused material such as fused quartz or metal for the transmission material. In this invention however the material for rod 14 is not fused material but a single pure crystal of any suitable material, examples of which will be mentioned presently. The use of a single pure crystal for the delay material appreciably reduces the attenuation of a signal traveling through the delay material and causes the signal appearing at the receiving crystal to be substantially identical to the signal applied at the transmitting crystal. It should be realized of course while the attenuation is appreciably reduced, it is not claimed that attenuation is entirely eliminated, for some attenuation of the signal will be present regardless of the type of transmission material employed. Some crystals that have been found to be ideally suited for transmission material in a supersonic delay line are in order of preference: lithium fluoride, sodium chloride, and potassium bromide. Single crystals of aluminum may be employed to advantage in some applications since the elastic modulus of aluminum crystals is nearly isotropic and the wave velocity will not vary with direction of propagation within the crystal. Single crystals of lead are fair transmitters of supersonic energy and may be employed in some applications. Quartz crystals have low attenuation of the signal but coupling between the various modes of transmission in quartz is so strong that the energy undergoes rapid partition.

The use of a single crystal for transmission medium is not limited to the particular apparatus or configuration shown in the drawing and it is not intended that the apparatus shown in the drawing shall in any way limit the scope of the invention. Therefore while there has been described what is at present considered the preferred embodiment of the invention, it will be obvious to those skilled in the art that various changes and modifications may be made therein without departing from the invention.

What is claimed is:

1. The method of delaying compressional waves for a time interval independent of the period of said waves, comprising the steps of propagating said waves in a single crystal medium having substantially isotropic compressional wave propagation characteristics, and detecting said waves after they have been propagated in said medium over a distance determined by the interval of delay desired.

2. The method of delaying supersonic compressional waves for a time interval independent of the period of said waves, comprising the steps of propagating said waves in a single crystal of a single material having substantially isotropic compressional wave propagation characteristics, and detecting said waves after they have been propagated in said crystal over a distance determined by the interval of delay desired.

3. The method of delaying compressional waves with relatively low attenuation for a time interval independent of the period of said waves, comprising the steps of propagating said waves in a single crystal of lithium fluoride, and detecting said waves after they have been propagated in said crystal over a distance determined by the interval of delay desired.

4. The method of delaying compressional waves with relatively low attenuation for a time interval independent of the period of said waves, comprising the steps of propagating said waves in a single crystal of sodium chloride, and detecting said waves after they have been propagated in said crystal over a distance determined by the interval of delay desired.

5. The method of delaying supersonic compressional waves with relatively low attenuation for a time interval independent of the period of said waves, comprising the steps of propagating said waves in a single crystal of a halide of an alkali metal, and detecting said waves after they have been propagated in said crystal over a distance determined by the interval of delay desired.

6. The method of delaying supersonic compressional waves with relatively low attenuation for a time interval independent of the period of said waves, comprising the steps of propagating said waves in a single crystal of aluminum, and detecting said waves after they have been propagated in said crystal over a distance determined by the interval of delay desired.

7. A system for delaying compressional waves for a time interval independent of the period of said waves, comprising a single crystal of a halide of an alkali metal, means for impressing said waves upon said crystal, and means for detecting said waves after they have been propagated in said crystal over a distance determined by the desired delay interval.

8. A system for delaying compressional waves for a time interval independent of the period of said waves, comprising a single crystal of lithium fluoride, means for impressing said waves upon said crystal, and means for detecting said waves after they have been propagated in said crystal over a distance determined by the desired delay interval.

9. A system for delaying compressional waves for a time interval independent of the period of said waves, comprising a single crystal of sodium chloride, means for impressing said waves upon said crystal, and means for detecting said waves after they have been propagated in said crystal over a distance determined by the desired delay interval.

10. A system for delaying compressional waves for a time interval independent of the period of said waves, comprising a single crystal of aluminum, means for impressing said waves upon said crystal, and means for detecting said waves after they have been propagated in said crystal over a distance determined by the desired delay interval.

11. A system for delaying compressional waves for a time interval independent of the period of said waves, comprising a single crystal having isotropic wave propagation characteristics, means for impressing said waves upon said crystal, and means for detecting said waves after they have been propagated in said crystal over a distance determined by the desired delay interval.

DAVID L. ARENBERG.

REFERENCES CITED

The following references are of record in the file of this patent:

UNITED STATES PATENTS

| Number | Name | Date |
|---|---|---|
| 1,799,634 | Norton | Apr. 7, 1931 |
| 2,300,075 | Sykes | Oct. 27, 1942 |
| 2,401,094 | Nicholson | May 28, 1946 |

OTHER REFERENCES

Structure of Metals, by Chas. S. Barrett, published by McGraw-Hill Co., New York, 1943, chapter XXI, pages 453–460. (Copy in Div. 3.)